United States Patent
Wang et al.

(10) Patent No.: US 10,094,714 B2
(45) Date of Patent: Oct. 9, 2018

(54) METHOD AND SYSTEM FOR GAS TEMPERATURE MEASUREMENT

(71) Applicant: General Electric Company, Schenectady, NY (US)

(72) Inventors: Guanghua Wang, Clifton Park, NY (US); Bin Ma, Clifton Park, NY (US); James Peter DeLancey, Corinth, NY (US); K. M. K. Genghis Khan, Niskayuna, NY (US); Carlos Bonilla Gonzalez, Cohoes, NY (US); Robert David Briggs, West Chester, OH (US); Nirm Velumylum Nirmalan, Liberty Township, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 381 days.

(21) Appl. No.: 15/078,868

(22) Filed: Mar. 23, 2016

(65) Prior Publication Data

US 2017/0276550 A1    Sep. 28, 2017

(51) Int. Cl.
    *G01J 5/60* (2006.01)
    *G01J 5/04* (2006.01)
    (Continued)

(52) U.S. Cl.
    CPC ........... *G01J 5/0088* (2013.01); *G01J 5/0014* (2013.01); *G01J 5/0887* (2013.01)

(58) Field of Classification Search
    CPC ............................ G01J 5/0088; G01J 5/0087
    See application file for complete search history.

(56) References Cited

U.S. PATENT DOCUMENTS

| 2,820,840 | A | 1/1958 | Cantlin et al. |
| 2,975,225 | A | 3/1961 | Barbieri et al. |

(Continued)

FOREIGN PATENT DOCUMENTS

| JP | 01176922 A | * | 7/1989 |
| JP | H10153488 A2 |   | 6/1996 |

(Continued)

OTHER PUBLICATIONS

L. P. Goss, et al., Thin-Filament Pyrometry: A Novel Thermometric Technique for Combusting Flows, Transactions of the ASME, 1989, 7 pages, vol. 111, Issue 46, Systems Research Laboratories, Dayton, OH.

(Continued)

*Primary Examiner* — Christopher Mahoney
*Assistant Examiner* — Leon W. Rhodes, Jr.
(74) *Attorney, Agent, or Firm* — GE Global Patent Operation; Nitin Joshi

(57) ABSTRACT

A temperature measurement system includes at least one temperature measurement probe. The at least one temperature measurement probe includes at least one hollow filament configured to emit thermal radiation in a predetermined and substantially continuous wavelength band at least partially representative of a temperature of the at least one hollow filament. The at least one hollow filament has a first diameter and a first emissivity. The at least one temperature measurement probe also includes at least one thin filament extending within at least a portion of the at least one hollow filament. The at least one thin filament is configured to emit thermal radiation in a predetermined and substantially continuous wavelength band at least partially representative of a temperature of the at least one thin filament. The at least one thin filament has a second emissivity and a second diameter less than the first diameter.

12 Claims, 12 Drawing Sheets

(51) Int. Cl.
  *G01J 5/00*  (2006.01)
  *G01J 5/08*  (2006.01)

(56) References Cited

U.S. PATENT DOCUMENTS

| | | | |
|---|---|---|---|
| 3,586,970 A | | 6/1971 | Conway |
| 4,576,486 A | * | 3/1986 | Dils .......................... G01J 5/08 |
| | | | 250/339.04 |
| 4,799,787 A | | 1/1989 | Mason |
| 5,180,227 A | * | 1/1993 | John .................... G01J 5/0014 |
| | | | 374/131 |
| 6,717,044 B2 | | 4/2004 | Kraus, II et al. |
| 2011/0240858 A1 | | 10/2011 | Estevadeordal et al. |
| 2015/0049786 A1 | | 2/2015 | Wang et al. |

FOREIGN PATENT DOCUMENTS

| | | | |
|---|---|---|---|
| JP | 2008249462 A2 | | 10/2008 |
| JP | 2010019624 A | * | 1/2010 |

OTHER PUBLICATIONS

Peter B. Kuhn, et al., Soot and Thin-Filament Pyrometry Using a Color Digital Camera, Proceedings of the combustion Institute, pp. 743-750, 2011, vol. 33, Science Direct, Elsevier.

Jun Ji, et al., Emission Spectroscopy Based Temperature Sensor for On-Line Non-Intrusive Gas Turbine Inlet Temperature Measurement, Proceedings of JPGC'01, 2001 International Joint Power Generation Conference, 10 pages, 2001, ASME.

Tzong H. Chen, et al., Conditional Velocity Measurements at the Base of Turbulent, Lifted Jet Flames, Systems Research Laboratories, Inc., 7 pages, 1990, AIAA/SAE/ASME/ASEE.

\* cited by examiner

METHOD AND SYSTEM FOR GAS TEMPERATURE MEASUREMENT

BACKGROUND

The field of the disclosure relates generally to gas temperature measurement, and more specifically, to methods and a system for measuring gas temperature in harsh environments based on radiation thermometry using thin filaments embedded within robust outer hollow filaments.

At least some known turbomachines, such as gas turbine engines, include a plurality of rotating turbine blades or buckets and stationary nozzle segments that channel high-temperature fluids, i.e., combustion gases, through the gas turbine engines. Many of these known gas turbine engines include temperature monitoring systems that provide operational temperature data in real time, i.e., at the time of measurement. Measuring gas temperatures in a combusting flame or harsh environment downstream of a combustor, i.e., a hot gas path may include many sources of inaccuracy and non-repeatability. Many of those relate to physical properties of the temperature measurement mechanisms positioned in or proximate the flow of the hot combustion gases and/or proximate the high-temperature gas turbine components. For example, such detection mechanisms include water-cooled thermocouple rakes and gas sampling/thermal radiation probes for point temperature measurements. However, these temperature measurement mechanisms do not account for radiation effects prominent in the hot gas path. Also, due to the low spatial resolution features and the low accuracy associated with measuring boundary layer temperature profiles, these temperature measurement mechanisms do not provide accurate temperature distribution profiles and alternative computational extrapolations and approximations must be used to facilitate spatial-resolution of the temperature profiles, albeit, with some inaccuracies induced by the modeling techniques and approximations used. In addition, due to the high temperatures in the hot gas path and the short service life of the thermocouple wires in such high-temperature environments, the water-cooled thermocouple rakes require a significant amount of water cooling for the necessary additional infrastructure to reduce accelerated wear on the associated fluid transport features. Therefore, the water-cooled thermocouple rakes cannot be operated indefinitely at high power conditions. Also, the additional cost of the water-cooling features in hardware, installation, and maintenance could be significant. At least some other known temperature measurement mechanisms include laser diagnostic techniques, e.g., laser Rayleigh scattering, laser Raman scattering, and planar laser induced fluorescence. However, these temperature measurement mechanisms are difficult to implement for temperature control of the gas turbine engine.

Therefore, to overcome the deficiencies of known temperature measurement mechanisms with respect to gas temperature profiles and near-wall temperature measurements in high-temperature and high-pressure environments, gas turbine manufacturers may elect to fabricate, install, and run hot gas components with greater thermal margins to extend the useful service life of such components. Increasing thermal margins typically manifests as increased wall thicknesses and other ruggedizing methods. Such increased ruggedness of those components increases the costs of production and increases a potential for premature reductions in service life due to excessive temperature profiles induced in the walls of the components during operations that typically include large-scale temperature changes, e.g., startups, shutdowns, and load changes. Increasing thermal margins during gas turbine operation is typically manifested as increased cooling flow rates for those components. Increased cooling flow usage for those components increases the fuel consumption and decreases gas turbine efficiency.

BRIEF DESCRIPTION

In one embodiment, a temperature measurement system is provided. The temperature measurement system includes at least one temperature measurement probe. The at least one temperature measurement probe includes at least one hollow filament configured to emit thermal radiation in a predetermined and substantially continuous wavelength band at least partially representative of a temperature of the at least one hollow filament. The at least one hollow filament has a first diameter and a first emissivity. The at least one temperature measurement probe also includes at least one thin filament extending within at least a portion of the at least one hollow filament. The at least one thin filament is configured to emit thermal radiation in a predetermined and substantially continuous wavelength band at least partially representative of a temperature of the at least one thin filament. The at least one thin filament has a second emissivity and a second diameter less than the first diameter.

In another embodiment, a temperature measurement system is provided. The temperature measurement system includes at least one temperature measurement probe. The at least one temperature measurement probe includes at least one hollow filament configured to emit thermal radiation in a predetermined and substantially continuous wavelength band at least partially representative of a temperature of the at least one hollow filament. The at least one hollow filament has a first diameter and a first emissivity. The at least one temperature measurement probe also includes at least one thin filament extending within at least a portion of the at least one hollow filament. The at least one thin filament is configured to emit thermal radiation in a predetermined and substantially continuous wavelength band at least partially representative of a temperature of the at least one thin filament. The at least one thin filament has a second emissivity and a second diameter less than the first diameter. The temperature measurement system also includes an optical system configured to receive at least a portion of the thermal radiation emitted from the at least one hollow filament and the at least one thin filament. The optical system includes a detector array configured to generate first electrical signals at least partially representative of the thermal radiation received from the at least one hollow filament and generate second electrical signals at least partially representative of the thermal radiation received from the at least one thin filament. The temperature measurement system further includes a controller communicatively coupled to the detector array. The controller is configured to transform the first electrical signals to a first temperature indication at least partially as a function of at least one of the first diameter and the first emissivity and transform the second electrical signals to a second temperature indication at least partially as a function of at least one of the second diameter and the second emissivity.

In yet another embodiment, a method of temperature measurement is provided. The method includes positioning at least one temperature measurement probe in a flow path of a fluid. The at least one temperature measurement probe includes at least one hollow filament having a first diameter and a first emissivity and at least one thin filament extending within at least a portion of the at least one hollow filament. The at least one thin filament has a second emissivity and a second diameter less than the first diameter. The method also includes positioning an optical system proximate the at least one temperature measurement probe and transmitting thermal radiation from the at least one filament to the optical system. The thermal radiation is at least partially representative of a temperature of the at least one hollow filament. The method further includes transmitting thermal radiation from the at least one thin filament to the optical system. The thermal radiation is at least partially representative of a temperature of the at least one thin filament. The method also includes generating first electrical signals at least partially representative of the thermal radiation received from the at least one hollow filament and generating second electrical signals at least partially representative of the thermal radiation received from the at least one thin filament. The method further includes transforming the first electrical signals to a first temperature indication at least partially as a function of at least one of the first diameter and the first emissivity. The method also includes transforming the second electrical signals to a second temperature indication at least partially as a function of at least one of the second diameter and the second emissivity. The method further includes transmitting the first and second temperature indications to a processor.

DRAWINGS

These and other features, aspects, and advantages of the present disclosure will become better understood when the following detailed description is read with reference to the accompanying drawings in which like characters represent like parts throughout the drawings, wherein.

Figure 1:
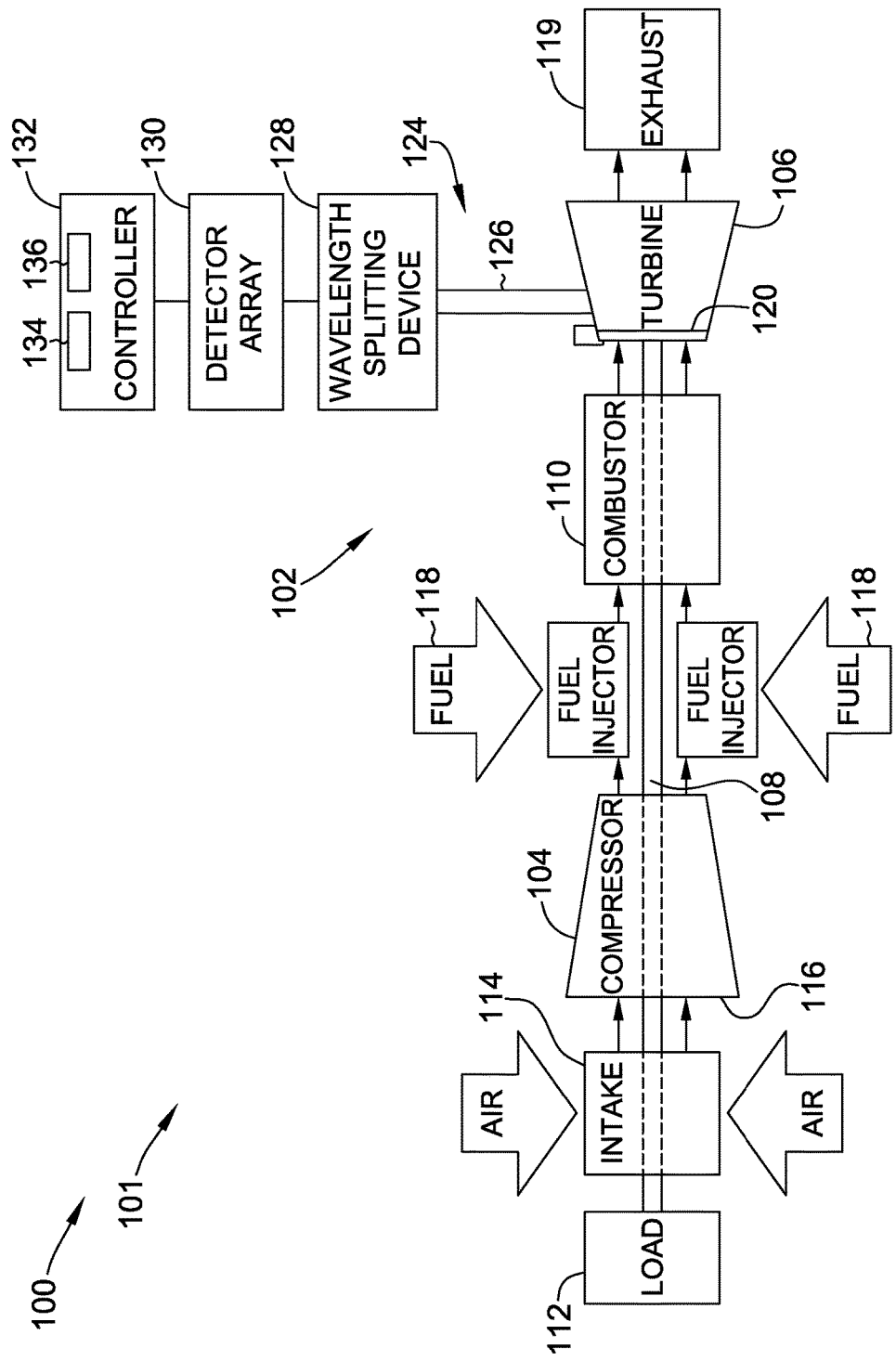
FIG. 1 is a schematic block diagram of an exemplary gas temperature measurement system implemented in an exemplary turbomachine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The gas temperature measurement systems described herein use thin filament pyrometry that provides a cost-effective and reliable means of monitoring process parameters in heretofore difficult areas of components that experience harsh environmental conditions. As such, the gas temperature measurement systems described herein provide a cost-effective method for monitoring temperatures of components in high temperature and/or high pressure environments. Specifically, the devices, systems, and methods described herein include a method and systems of measuring gas temperatures using radiation thermometry principles to measure hot gas temperatures using silicon carbide filaments. The filaments are inserted into the hot gas stream and heated up to high temperatures at a balance of convection heating and radiation/conduction cooling. The incandescence signals emitted from the hot filaments are measured, and calibrated to determine the filament surface temperatures based on the Planck's radiation law. The gas temperature is then determined from the measured surface temperatures through a correction procedure to account for the radiative cooling loss. The filament probes disclosed herein include a thin filament within a robust outer hollow filament. Both the thin filament and the outer hollow filament are used to measure the temperatures and the outer hollow filament provides mechanical support to the inner thin filament which otherwise would not have sufficient lifing in the harsh environment. The surface temperatures measured from the inner filament and outer hollow filament are used to derive the local gas temperature based on a multi-element approach, which does not require measurement of the exact flow properties around the probe. As such, the devices, systems, and methods described herein facilitate substantially reduced physical intrusion into the hot gas path of gas turbine engines and lower material and installation costs due to the elimination of water-cooling apparatus. Also, the outer hollow filament facilitates extended lifing of the thin filament enclosed therein. Such extended lifing may be enhanced with air cooling of the temperature measurement probes. Further, taking temperature measurements with two or more devices with varying diameters in close proximity, e.g., multiple thin filaments with varying diameters in an outer hollow filament, facilitates increased accuracy and spatial resolution of the associated temperature measurements. Such increased accuracy and spatial resolution of the associated temperature measurements is further enhanced through the use of a plurality of the unique temperature measurement probes in array and rake configurations.

FIG. 1 is a schematic view of an industrial facility 100 that includes a turbomachine, and more specifically, a gas turbine engine system 101. In the exemplary embodiment, gas turbine engine system 101 is a land-based gas turbine. Alternatively, gas turbine engine system 101 includes any gas turbine engine that enables operation of system 101 as described herein, including, without limitation, naval gas turbines and aircraft engines. In the exemplary embodiment, gas turbine engine system 101 includes a gas temperature measurement system 102. Gas temperature measurement system 102 may be used in any other facilities and with any other apparatus and processes that use gas temperature measurements, e.g., without limitation, power and auxiliary boilers, other turbomachinery, chemical processing plants, including, without limitation, refining plants, and solar collectors.

In the exemplary embodiment, gas turbine engine system 101 includes a compressor 104 and turbine 106 mounted on a common shaft 108 and coupled in a serial flow arrangement with a combustor 110 positioned between them. A load 112, such as, but not limited to, a generator, a pump, and a compressor is also drivingly coupled to shaft 108.

During operation, air or other oxygen containing working fluid is received at an air intake 114 and directed to an inlet 116 of compressor 104, compressed air is then directed to combustor 110, where fuel 118 is added to the flow of compressed air and ignited, generating a flow of relatively hot, high-energy gases. The gases are directed through turbine 106, where work is extracted to drive compressor 104 and load 112. The exhausted gases are expelled through an exhaust section 119.

While gas turbine engine system 101 is in operation, gas temperature measurement system 102 monitors one or more temperatures of the gases passing through gas turbine engine system 101. Gas temperature measurement system 102 includes a plurality of temperature measurement probes 120 positioned within a flow path of the hot high-energy gases generated in combustor 110. In various embodiments, probes 120 may be positioned at for example, but not limited to, an inlet to combustor 110, an outlet from combustor 110, an inlet to turbine 106, and an outlet from turbine 106. Probes 120 may also be coupled to various components operating in the gas paths of gas turbine engine system 101, such as, but not limited to, stationary surfaces, e.g., compressor vanes, cooling apertures, turbine nozzles, and turbine exhausts, and rotatable surfaces, e.g., land-based turbine buckets, aircraft engine blades, and compressor/fan blades. Also, in the exemplary embodiment, an optical system 124 includes sufficient collection optics, i.e., optical system 124 includes an optical component 126 fabricated of a material that is at least partially transparent to thermal radiation emitted by probes 120 to collect the thermal radiation light from probes 120. Optical component 126 is any device that enables operation of optical system 124 and gas temperature measurement system 102, including, without limitation, windows, lens, and mirrors. Optical system 124 also includes a wavelength splitting device 128 that is configured to split broad wavelength band thermal radiation signals into a plurality of relatively narrow band thermal radiation signals. Optical system 124 further includes at least one detector array 130 that is configured to convert the relatively narrow band thermal radiation signals to digital signals.

Also, in the exemplary embodiment, gas temperature measurement system 102 includes a controller 132 that includes a processor 134 and a memory 136. Memory 136 includes one or more predetermined algorithms configured, when executed by processor 134 to convert the digital signals into temperature indication based on a predetermined calibration curve.

Controller 132 is programmed with sufficient instructions and algorithms to enable operation of gas temperature measurement system 102 as described herein. In general, multi-color pyrometry (MCP) algorithms are used to determine the gas temperature. In the exemplary embodiment, at least one of a linear least-squares multi-color pyrometry (LSMCP) method and a non-linear MCP method is used to determine temperatures. Alternatively, any other methods, including, without limitation, ratio-metric MCP, that enable operation of gas temperature measurement system 102 may be used. Alternatively, the non-linear MCP method may be used to generate solutions through an iterative method. Use of the algorithms described above facilitates increasing the accuracy of temperature measurements by reducing the effects of contamination on optical component 126 that may affect transmission, and measuring emissivity to decrease the effects of variable emissivity on temperature measurements.

As shown in the exemplary embodiment, gas temperature measurement system 102 monitors one or more temperatures of the gases passing through turbine 106 of gas turbine engine system 101. Alternatively, gas temperature measurement system 102 may be used to measure gas temperatures associated with other portions of gas turbine engine system 101, including, without limitation, any portion of air intake 114, compressor 104, combustor 110, and exhaust section 119.

Figure 2:
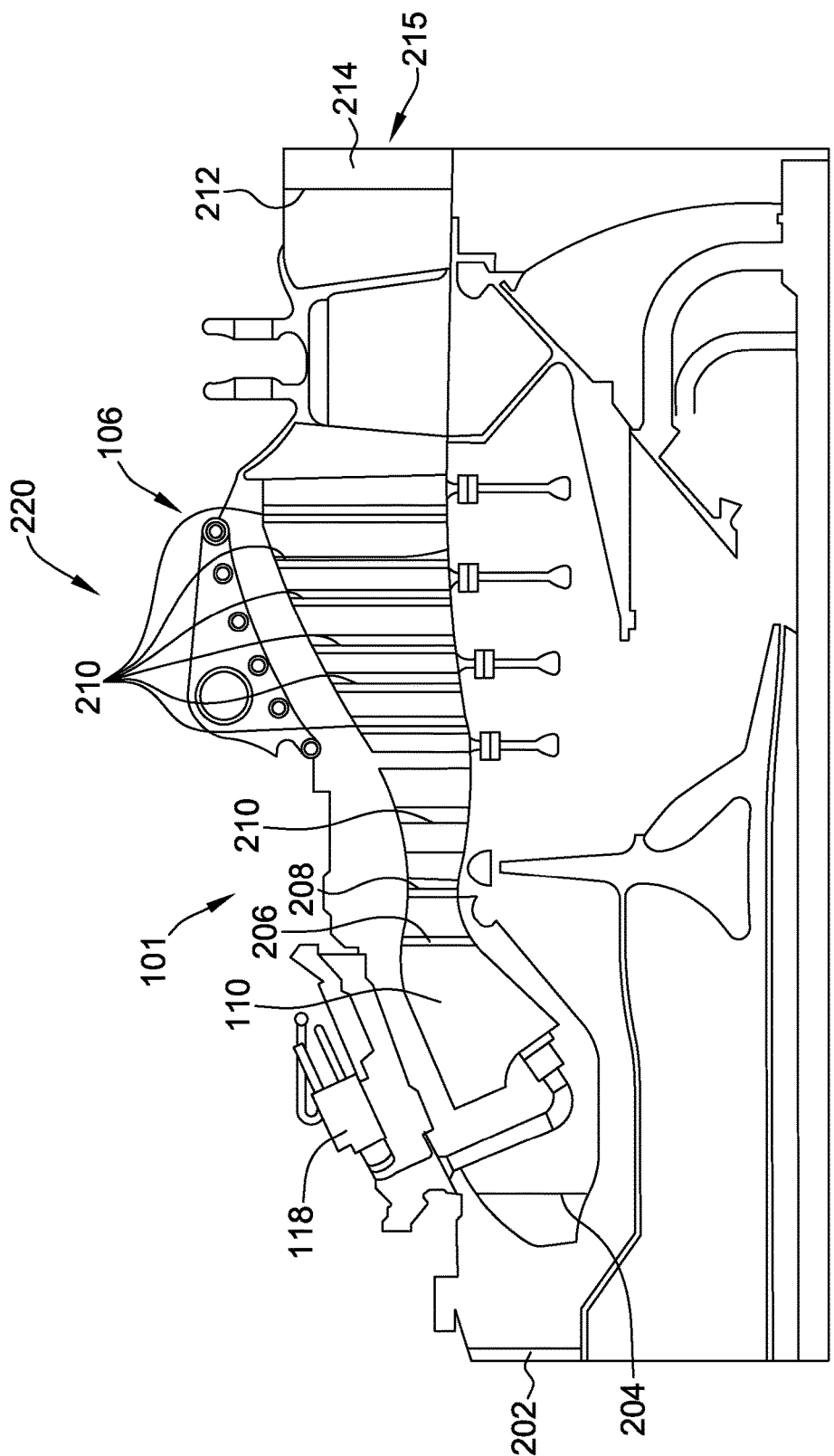
FIG. 2 is a schematic cross-sectional view of a portion of the turbomachine shown in FIG. 1.

FIG. 2 is a side cross-sectional view of a portion of gas turbine engine system 101. In the exemplary embodiment, FIG. 2 illustrates using gas temperature measurement system 102 to measure gas temperature at a compressor outlet 202, a combustor inlet 204, a combustor exit 206, an S1N location 208, and at inter-stages 210 of turbine 106, and inside or at the exit 212 of one or more nozzles 214 and exhaust 215. In alternative embodiments, gas temperature measurement system 102 can be used to measure gas temperatures in other positions of gas turbine engine system 101 not shown in FIG. 2, e.g., without limitation, air intake 114, compressor 104, exhaust section 119 (all shown in FIG. 1), and secondary flows (not shown) in gas turbine engine system 101. Combustor exit 206, S1N location 208, interstages 210, exit 212, nozzles 214, and exhaust 215 define a hot-gas path 220.

Figure 3:
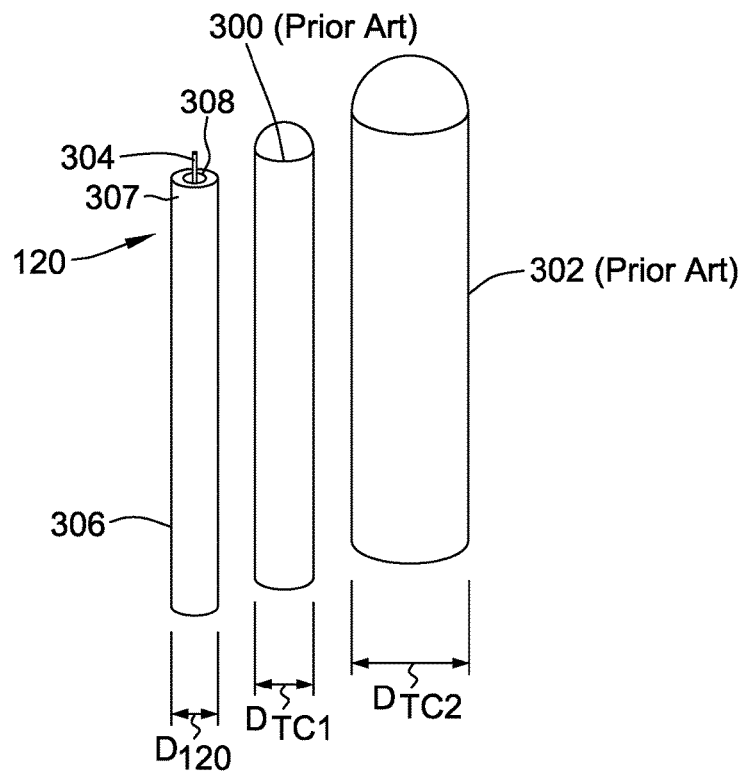
FIG. 3 is a schematic perspective view of an exemplary temperature measurement probe that may be used with the gas temperature measurement system shown in FIG. 1 in comparison with known temperature measurement probes.
Figure 4:
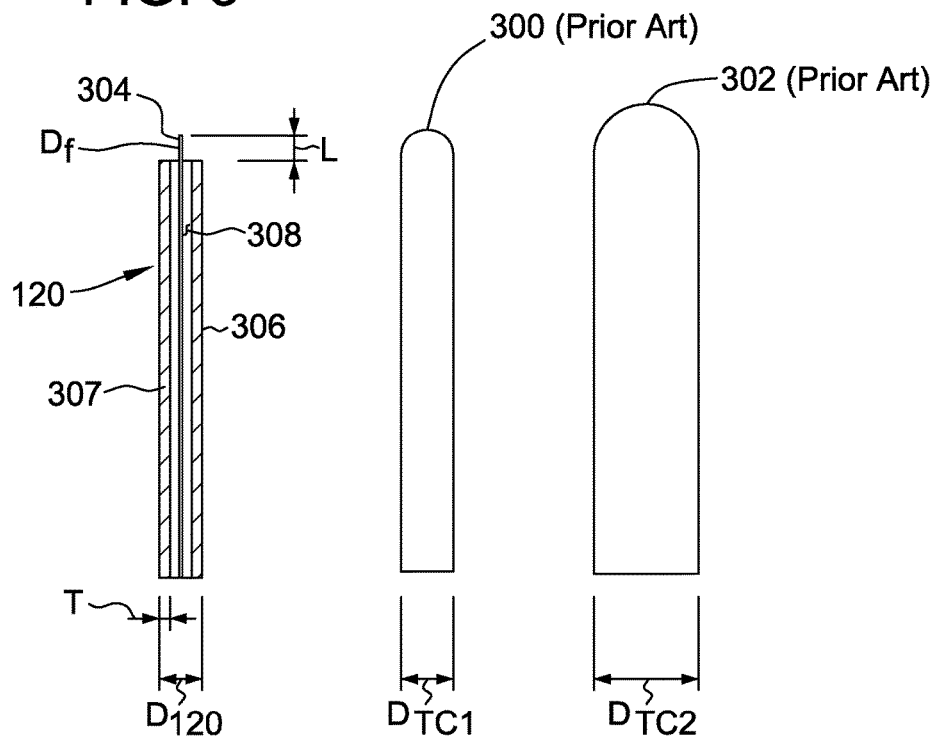
FIG. 4 is a schematic cross-sectional view of the temperature measurement probes shown in FIG. 3.

FIG. 3 is a schematic perspective view of an exemplary temperature measurement probe 120 that may be used with gas temperature measurement system 102 (shown in FIG. 1) in comparison with known temperature measurement probes, i.e., prior art thermocouple devices 300 and 302. FIG. 4 is a schematic cross-sectional view of temperature measurement probe 120 and thermocouples 300 and 302. Thermocouple 300 has a diameter $D_{TC1}$ of approximately 1.59 millimeters (mm) (1/16 inches (in.)) and thermocouple 302 has a diameter $D_{TC2}$ of approximately 3.18 mm (1/8 in.). In contrast, temperature measurement probe 120 has a diameter $D_{120}$ within a range between and including approximately 1.59 mm and 3.18 mm. Alternatively, temperature measurement probe 120 has any diameter that enables operation of temperature measurement probe 120 and temperature measurement system 102 as described herein. In the exemplary embodiment, temperature measurement probe 120 includes a thin filament 304 extending within an outer hollow filament 306.

Gas temperature measurement based on radiation thermometry using thin filaments facilitates measuring gas temperatures in hot or reacting flows in the range of approximately 500° K to approximately 2500° K with an uncertainty of approximately 50° K, a precision of approximately 1° K, a spatial resolution of approximately 50 microns, and temporal resolution of approximately 0.1 micro-sec.

In the exemplary embodiment, thin filament 304 is configured to emit thermal radiation in a predetermined and substantially continuous wavelength band at least partially representative of a temperature of filament 304. A diameter $D_f$ of thin filament 304 is within a range between and including 10 microns (μ) and approximately 5 mm. Also, in the exemplary embodiment, thin filament 304 has an emissivity within a range between approximately 0.3 and approximately 1.0. Alternatively, thin filament 304 has any dimensions and emissivities that enable operation of gas temperature measurement system 102 and temperature measurement probe 120 as described herein. By mounting temperature measurement probes 120 in different parts of the hot-gas path (HGP) flow fields the gas temperature distribution can be obtained in two or three dimensions.

Also, in the exemplary embodiment, thin filament 304 is formed silicon-carbide (SiC), which is selected for its good mechanical strength, modulus and fatigue strength under high temperature and pressure harsh environments, relatively constant emissivity, resistance to oxidation and catalytic effects, and wide availability. Other materials can also be used to form thin filaments, for example, and without limitation, sapphire, fused silica, tungsten alloy, graphite, nickel-based alloy, and stainless steel. When used for gas temperature measurements, filament 304 is placed in the hot gas flows and optical system 124 (shown in FIG. 1) detects thermal radiation from filament 304. A temperature of filament 304 is calculated from a calibration curve (not shown) and the gas temperature is then inferred through the energy balance between filament 304, the gas flow, and surrounding environment. To measure gas temperature inside running gas turbines, filament 304 is placed in the hot gas flows, e.g., combustor, stage one nozzle (S1N) and stage one blade (S1B). Thermal radiation from filament 304 is collected through view ports or windows on the gas turbine casing (not shown). Optical system 124 detects the thermal radiation and transforms it into digital signals. Filament temperature is calculated from the calibration curve.

Further, in the exemplary embodiment, outer hollow filament 306 is similar to thin filament 304 in that hollow filament 306 is also configured to emit thermal radiation in a predetermined and substantially continuous wavelength band at least partially representative of a temperature of hollow filament 306. Hollow filament 306 defines diameter $D_{120}$ of temperature measurement probe 120, i.e., within a range between and including approximately 0.50 mm and 6.00 mm. Also, similar to thin filament 304, hollow filament 306 has an emissivity within a range between approximately 0.3 and approximately 1.0. Alternatively, hollow filament 306 has any dimensions and emissivities that enable operation of gas temperature measurement system 102 and temperature measurement probe 120 as described herein. Further, similar to thin filament 304 and for similar reasons, hollow filament 306 is formed from one of, and without limitation, silicon carbide, sapphire, fused silica, tungsten alloy, graphite, nickel-based alloy, and stainless steel.

Moreover, in the exemplary embodiment, thin filament 304 extends from hollow filament 306 for a length L that is sized according to the relationship between length L and filament diameter $D_f$, i.e., $L/D_f > 10$, or, $L > D_f*10$. As such, L and $D_f$ are not shown to scale in FIGS. 3 and 4. Hollow filament 306 includes a substantially cylindrical wall 307 with a wall thickness T that defines a substantially annular inner region 308 that receives thin filament 304. Wall thickness T has any value that enables operation of temperature measurement probe 120 and temperature measurement system 102 as described herein, including, within a range inclusive of 0.1 mm and 5.0 mm. Thin filament 304 and hollow filament 306 are coupled to the predetermined surface(s) through at least one of chemical bonding and mechanical bonding, e.g., without limitation, welding, and a combination of mechanical and chemical bonding techniques.

In operation, temperature measurement probes 120 are exposed to the hot combustion gases generated as described above such that both the exposed portions of filament 304 and hollow filament 306 are heated up to high temperatures where the surface temperatures measured from filament 304 and outer hollow filament 306 are used to derive the local gas temperature based on a multi-element approach, which does not require measurement of the exact flow properties around probe 120.

Figure 5:
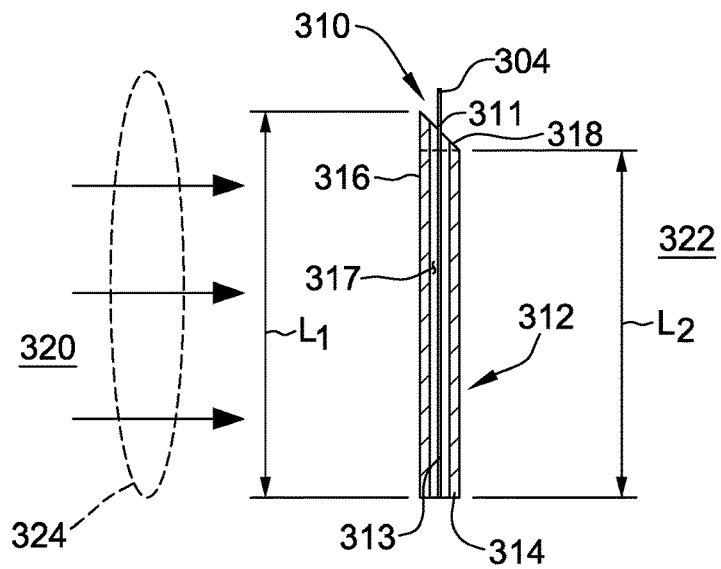
FIG. 5 is a schematic cross-sectional view of an alternative temperature measurement probe that may be used with the gas temperature measurement system shown in FIG. 1.

FIG. 5 is a schematic cross-sectional view of an alternative temperature measurement probe 310 that may be used with gas temperature measurement system 102 (shown in FIG. 1). Probe 310 includes filament 304 and an alternative outer hollow filament 312, where a portion 311 of filament 304 extends within hollow filament 312 and another portion 313 of filament 304 extends from hollow filament 312. In this alternative embodiment, hollow filament 312 includes a substantially cylindrical section 314 and a cuneiform (wedge-shaped) section 316 coupled to substantially cylindrical section 314. Cylindrical section 314 and cuneiform section 316 define a substantially annular inner region 317. Also, in this alternative embodiment, substantially cylindrical section 314 and cuneiform section 316 are unitarily formed together. Alternatively, substantially cylindrical section 314 and cuneiform section 316 are formed separately and coupled through methods that facilitate sufficient bonding strength for such harsh conditions, including, without limitation, welding. Cuneiform section 316 includes a sloped surface 318 that defines a first length $L_1$ and a second length $L_2$ diametrically opposed to first length $L_1$. First length $L_1$ is greater than second length $L_2$. First length $L_1$ defines an upstream portion 320 of temperature measurement probe 310 and second length $L_2$ defines a downstream portion 322 of temperature measurement probe 310. A high temperature gas flow 324 impinges upon upstream portion 320.

Figure 6:
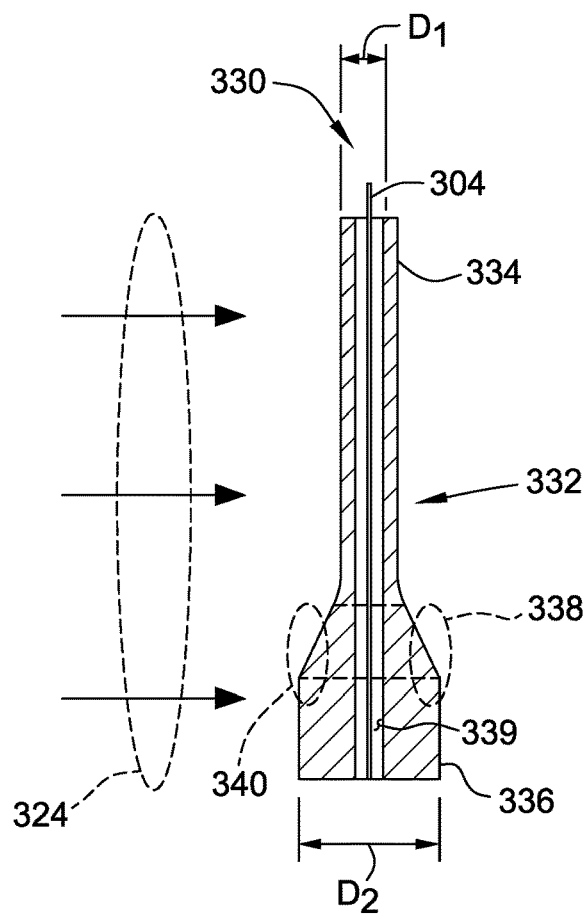
FIG. 6 is a schematic cross-sectional view of another alternative temperature measurement probe that may be used with the gas temperature measurement system shown in FIG. 1.

FIG. 6 is a schematic cross-sectional view of another alternative temperature measurement probe 330 that may be used with gas temperature measurement system 102 (shown in FIG. 1). Probe 330 includes filament 304 and an alternative outer hollow filament 332, where a portion of filament 304 is embedded within hollow filament 332 and another portion of filament 304 extends from hollow filament 332. In this alternative embodiment, hollow filament 332 includes a substantially cylindrical first section 334 having a first diameter $D_1$. Hollow filament 332 also includes a substantially cylindrical second section 336 having a second diameter $D_2$ that is greater than first diameter $D_1$. Hollow filament 332 further includes a substantially frustoconical section 338 between substantially cylindrical first section 334 and substantially cylindrical second section 336. Alternatively, section 338 has any configuration that enables operation of probe 330 and gas temperature measurement system 102 as described herein, including, without limitation, configuration 340. Frustoconical section 338, cylindrical first section 334, and cylindrical second section 336 define a substantially annular inner region 339. Also, in this alternative embodiment, substantially cylindrical section 314, substantially cylindrical second section 336, and substantially frustoconical section 338 are unitarily formed together. Alternatively, substantially cylindrical first section 334, substantially cylindrical second section 336, and substantially frustoconical section 338 are formed separately and coupled through methods that facilitate sufficient bonding strength for such harsh conditions, including, without limitation, welding.

Figure 7:
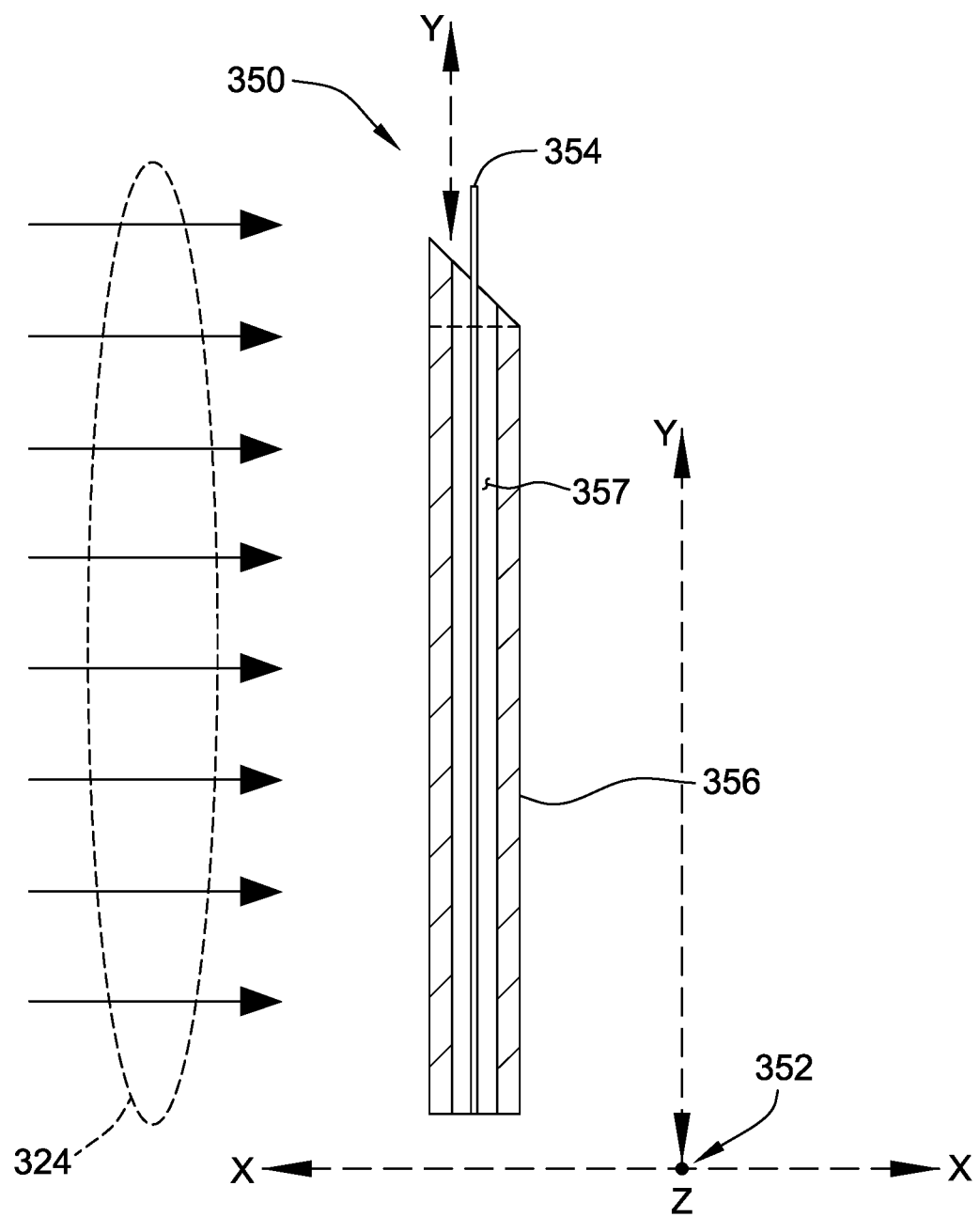
FIG. 7 is a schematic cross-sectional view of yet another alternative temperature measurement probe that may be used with the gas temperature measurement system shown in FIG. 1.

FIG. 7 is a schematic cross-sectional view of yet another alternative temperature measurement probe 350 that may be used with gas temperature measurement system 102 (shown in FIG. 1). A coordinate system 352 is shown to facilitate discussion of probe 350. Coordinate system 352 includes an x-axis, a y-axis, and a z-axis, all three axes orthogonal to each other. Probe 350 includes an alternative thin filament 354 that is similar to filament 304 (shown in FIGS. 3-6), however, thin filament 354 is configured to translate parallel to the y-axis. Probe 350 also includes an alternative outer hollow filament 356 that defines a substantially annular inner region 357.

In this alternative embodiment, hollow filament 356 is similar to hollow filament 312 (shown in FIG. 5), however, hollow filament 356 is configured to translate parallel to one or more of the x-axis, the y-axis, and the z-axis. Specifically, hollow filament 356 is mounted (mechanically or chemically) on a translating mechanism (not shown). Similarly, thin filament 354 may also be mounted to a separate translating mechanism (not shown) such that thin filament 354 and hollow filament 356 may be translated separately in parallel with to one or more of the x-axis, the y-axis, and the z-axis, including different translation paths. For example, translating hollow filament 356 parallel to the x-axis and the z-axis facilitates moving temperature measurement probe 350 to a plurality of locations for increased diversity in temperature measurement data collection. Also, for example, translating thin filament 354 parallel to the y-axis facilitates withdrawing thin filament 354 from gas stream 324 for extending the service life and for deploying thin filament 354 on a situational basis. In some embodiments, the translating mechanisms include at least one stepper motor coupled to one or more of thin filament 354 and hollow filament 356. Each stepper motor provides translation in only one direction. Therefore, translation of hollow filament 356 in two or three dimensions requires two and three stepper motors, respectively. Many known stepper motors are sufficiently rugged to operate in the high-temperature environments of hot gas path 220. In addition, in some embodiments, heat removal systems associated with the translating mechanisms further facilitates life extension of such translating mechanisms. Alternatively, rather than stepper motors, rotational motors are used to generate a 2D map scan.

Figure 8:
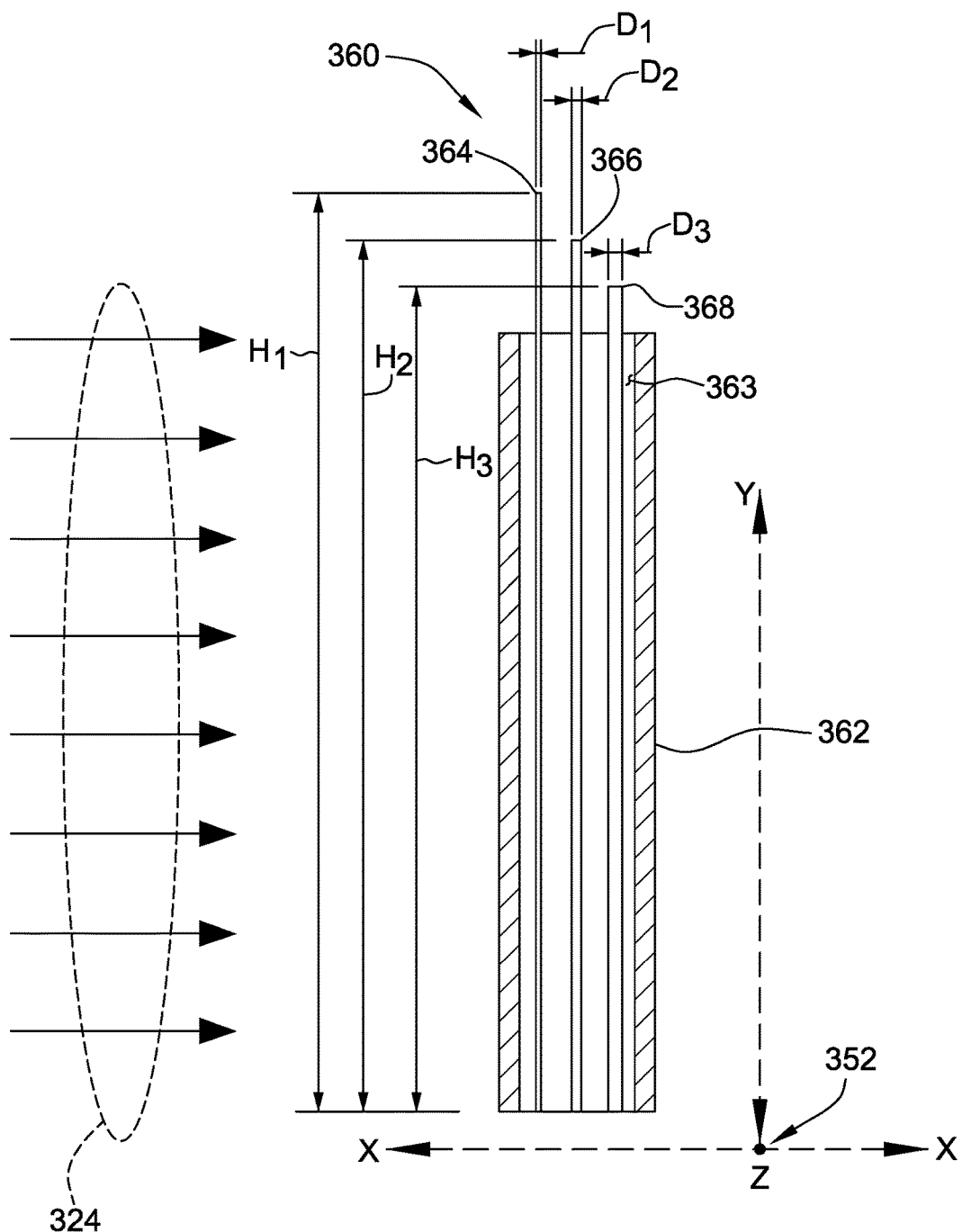
FIG. 8 is a schematic cross-sectional view of a further alternative temperature measurement probe that may be used with the gas temperature measurement system shown in FIG. 1.

FIG. 8 is a schematic cross-sectional view of a further alternative temperature measurement probe 360 that may be used with gas temperature measurement system 102 (shown in FIG. 1). Coordinate system 352 is shown to facilitate discussion of probe 360. Coordinate system 352 includes x-axis, y-axis, and z-axis, all three axes orthogonal to each other. Probe 360 includes an alternative, substantially cylindrical hollow filament 362 defining a substantially annular inner region 363 and is configured to translate parallel to each of the x-axis, the y-axis, and the z-axis in a manner similar to that for hollow filament 356 (shown in FIG. 7). Probe 360 includes a plurality of filaments (three shown), i.e., a first thin filament 364, a second thin filament 366, and a third thin filament 368 that are similar to thin filament 304 (shown in FIGS. 3-6) and thin filament 354 (shown in 7), and where thin filaments 364, 366, and 368 are proximate each other. Similar to thin filament 354 (shown in FIG. 7), thin filaments 364, 366, and 368 may also be translatable. First thin filament 364 has a first diameter $D_1$ and a first height $H_1$, second thin filament 366 has a second diameter $D_2$ and a second height $H_2$, and third thin filament 368 has a third diameter $D_3$ and a third height $H_3$, where, in this alternative embodiment, all three of first diameter $D_1$, second diameter $D_2$, and third diameter $D_3$ have different values and all three of first height $H_1$, second height $H_2$, and third height $H_3$ have different values. In some embodiments, filaments 364, 366, and 368 have similar emissivities and in other embodiments, they have different emissivities. As such, temperature measurement probe 360 includes any number of filaments 364, 366, 368, with any values for diameters $D_1$, $D_2$, $D_3$, and heights $H_1$, $H_2$, $H_3$ in any configuration that enables operation of temperature measurement probe 360 and gas temperature measurement system 102 as described herein. For example, and without limitation, temperature measurement probe 360 facilitates taking temperature measurements with two or more devices with varying diameters in close proximity, e.g., multiple thin filaments with varying diameters and/or emissivities and/or varying lengths extending into gas flow 324 from outer hollow filament 362, facilitates increased accuracy and spatial resolution of the associated temperature measurements, including those measurements obtained from hollow filament 362.

Figure 9:
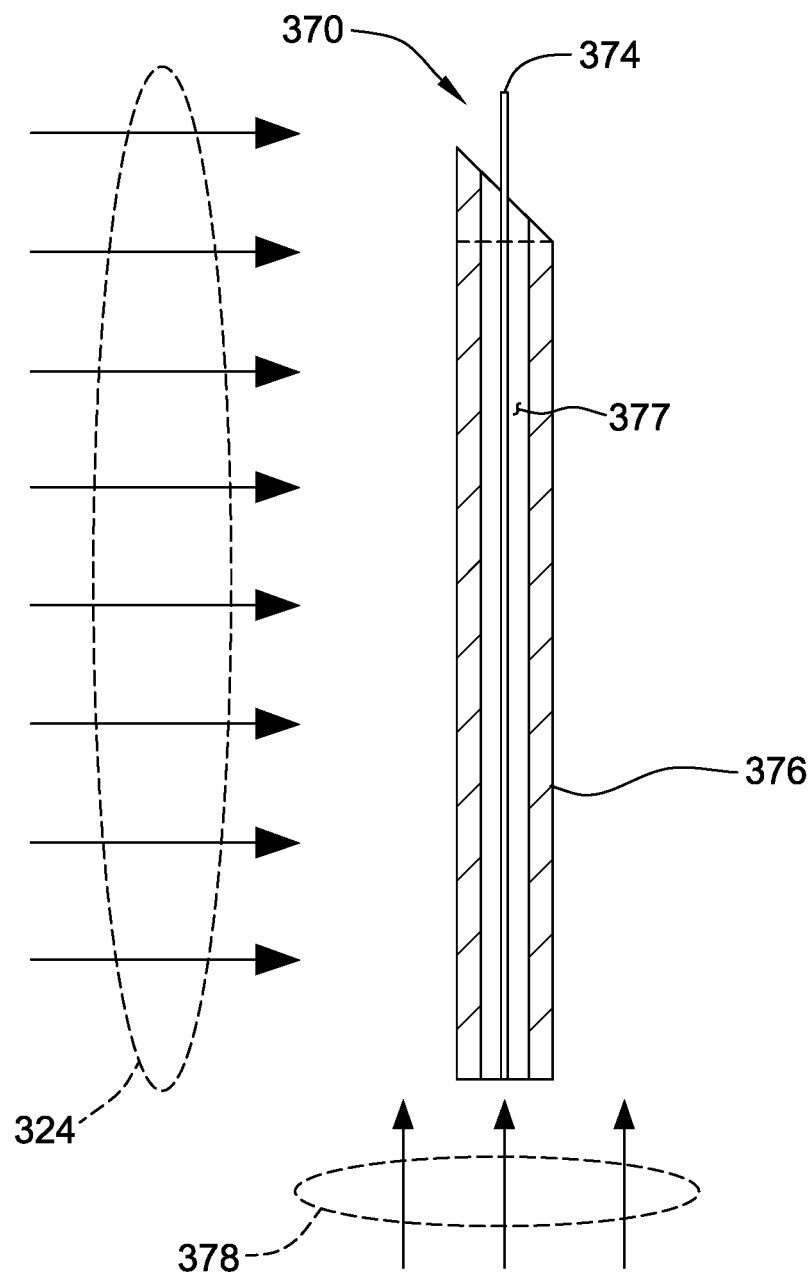
FIG. 9 is a schematic cross-sectional view of yet a further alternative temperature measurement probe that may be used with the gas temperature measurement system shown in FIG. 1.

FIG. 9 is a schematic cross-sectional view of yet a further alternative temperature measurement probe 370 that may be used with gas temperature measurement system 102 (shown in FIG. 1). Probe 370 includes an alternative thin filament 374 that is similar to filament 304 (shown in FIGS. 3-6). Probe 370 also includes an alternative outer hollow filament 376 defining a substantially annular inner region 377. In this alternative embodiment, hollow filament 376 is similar to hollow filament 312 (shown in FIG. 5), however, hollow filament 376 is configured to receive cooling fluid 378 for heat removal therefrom. Hollow filament 376 has any heat transfer features that facilitate heat removal therefore, including, without limitation, internal chambers and channels and surface pores (neither shown). Application of cooling fluid 378 to remove heat from probe 370 facilitates extending the service life of probe 370.

Figure 10:
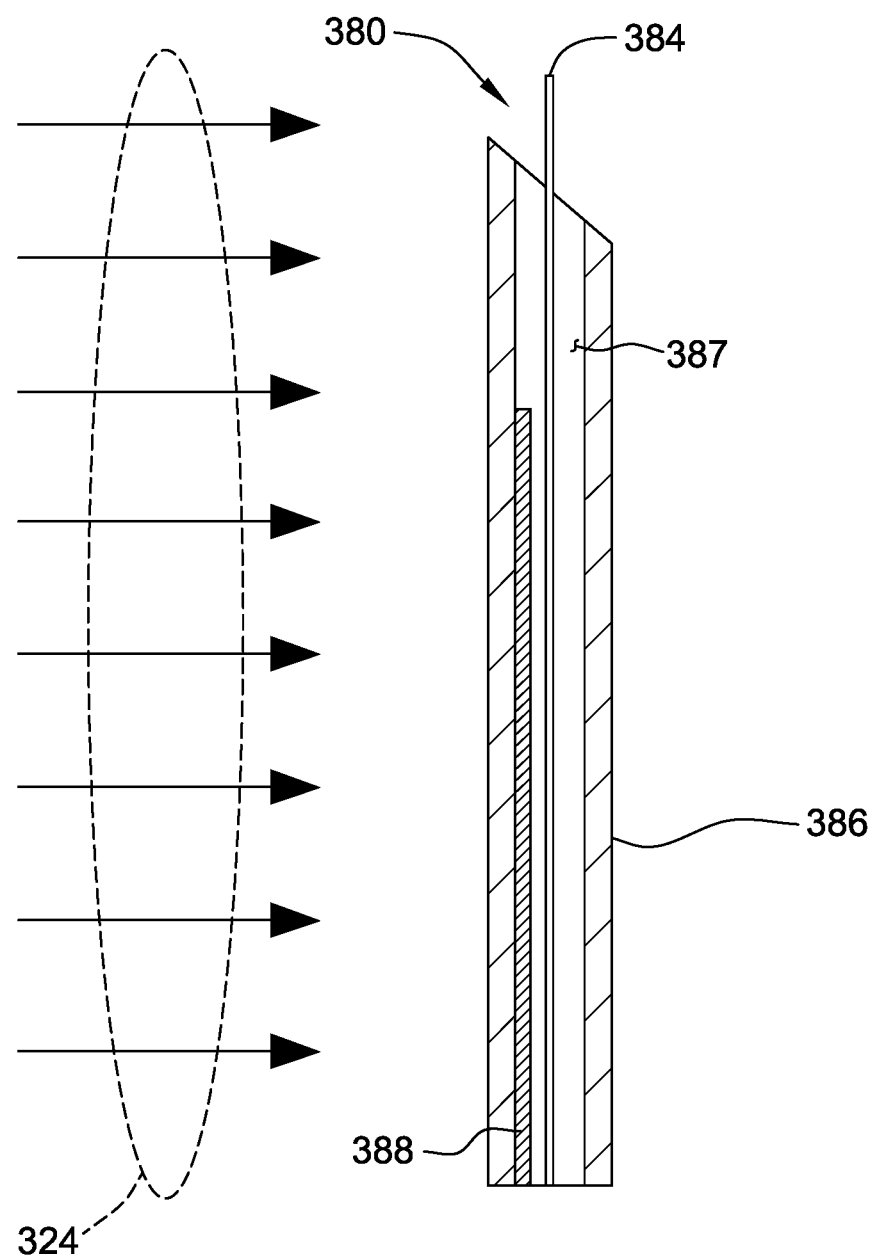
FIG. 10 is a schematic cross-sectional view of yet another alternative temperature measurement probe that may be used with the gas temperature measurement system shown in FIG. 1.

FIG. 10 is a schematic cross-sectional view of yet another alternative temperature measurement probe 380 that may be used with the gas temperature measurement system shown in FIG. 1. Probe 380 includes an alternative thin filament 384 that is similar to filament 304 (shown in FIGS. 3-6). Probe 380 also includes an alternative outer hollow filament 386 defining a substantially annular inner region 387. In this alternative embodiment, hollow filament 386 is similar to hollow filament 312 (shown in FIG. 5), however, hollow filament 386 is configured to receive an in-situ calibration reference thermocouple 388 within region 387 that facilitates verifying the accuracy and precision of temperature measurements obtained from filament 384 and hollow filament 386.

Figure 11:
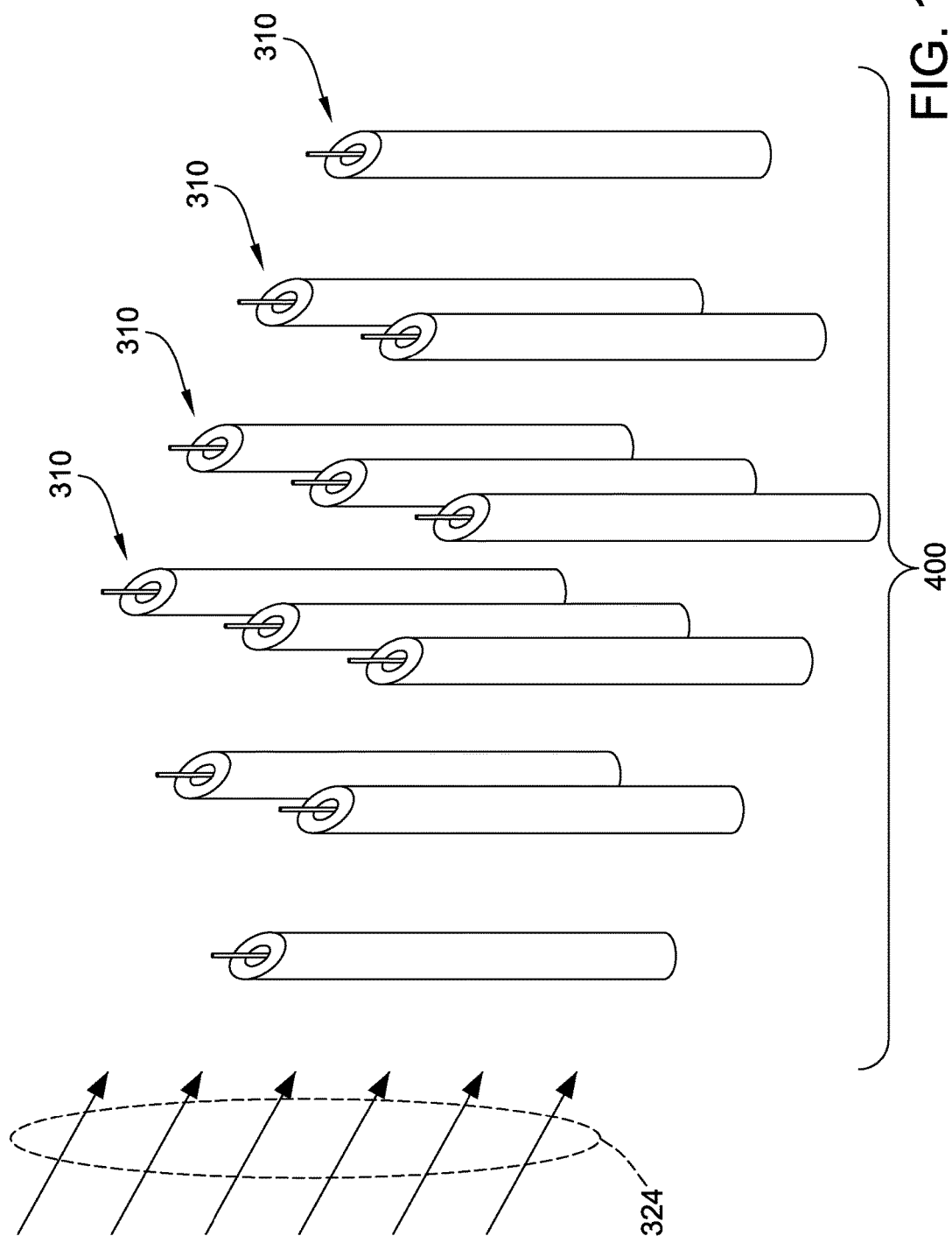
FIG. 11 is a schematic cross-sectional view of a plurality of the temperature measurement probes shown in FIG. 5 in an array pattern.
Figure 12:
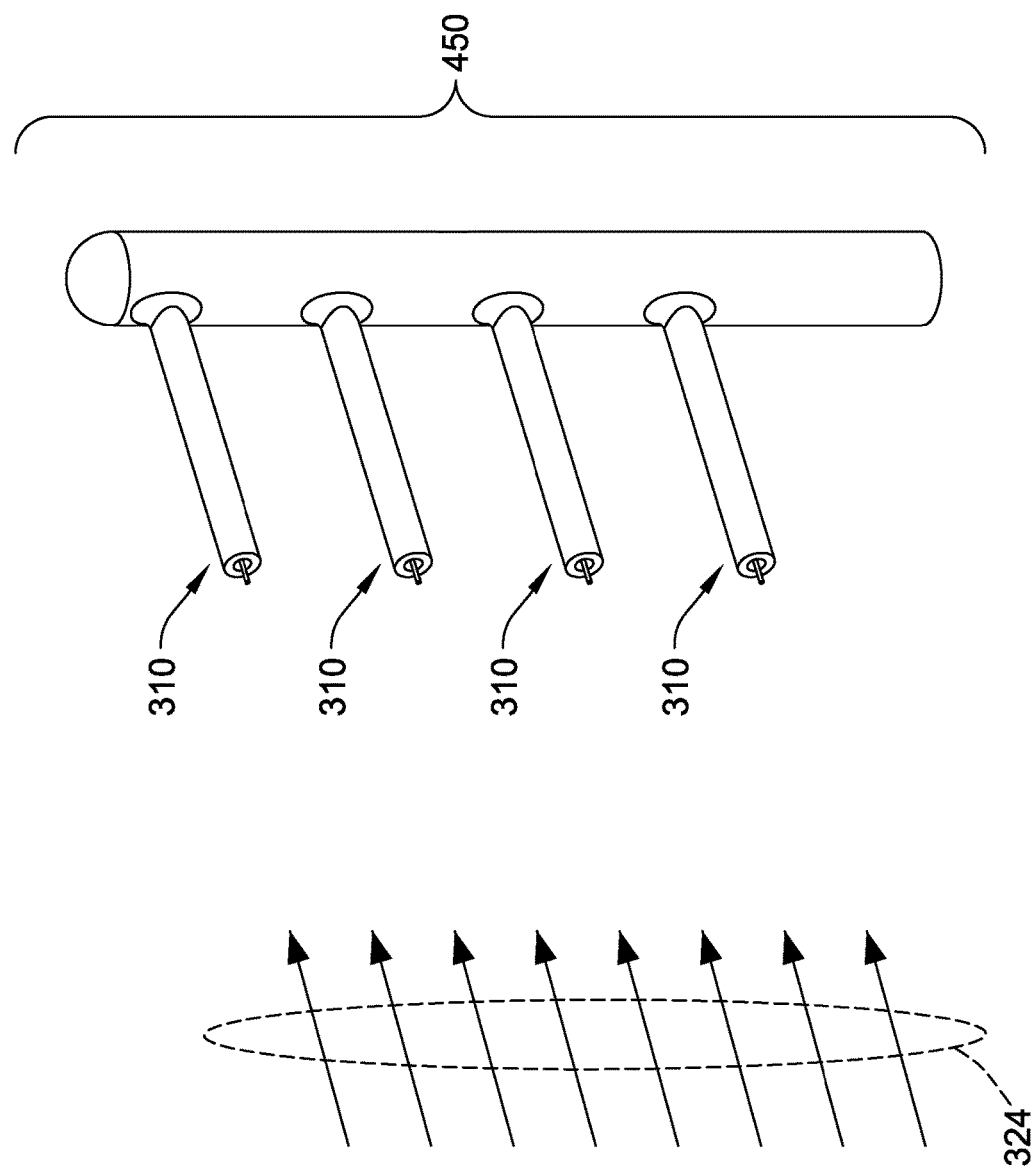
FIG. 12 is a schematic cross-sectional view of a plurality of the temperature measurement probes shown in FIG. 5 in a rake pattern.

FIG. 11 is a schematic cross-sectional view of a plurality of temperature measurement probes 310 in an array configuration 400. FIG. 12 is a schematic cross-sectional view of a plurality of temperature measurement probes 310 in a rake pattern 450. The increased accuracy and spatial resolution of the associated temperature measurements is further enhanced through the use of a plurality of temperature measurement probes 310 in array configuration 400 and rake configuration 450, thereby increasing the number of temperature measurement data collection devices per unit area. While temperature measurement probes 310 are shown, any of probes 330, 350, 360, 370, and 380 may also be used in any combination thereof.

Figure 13:
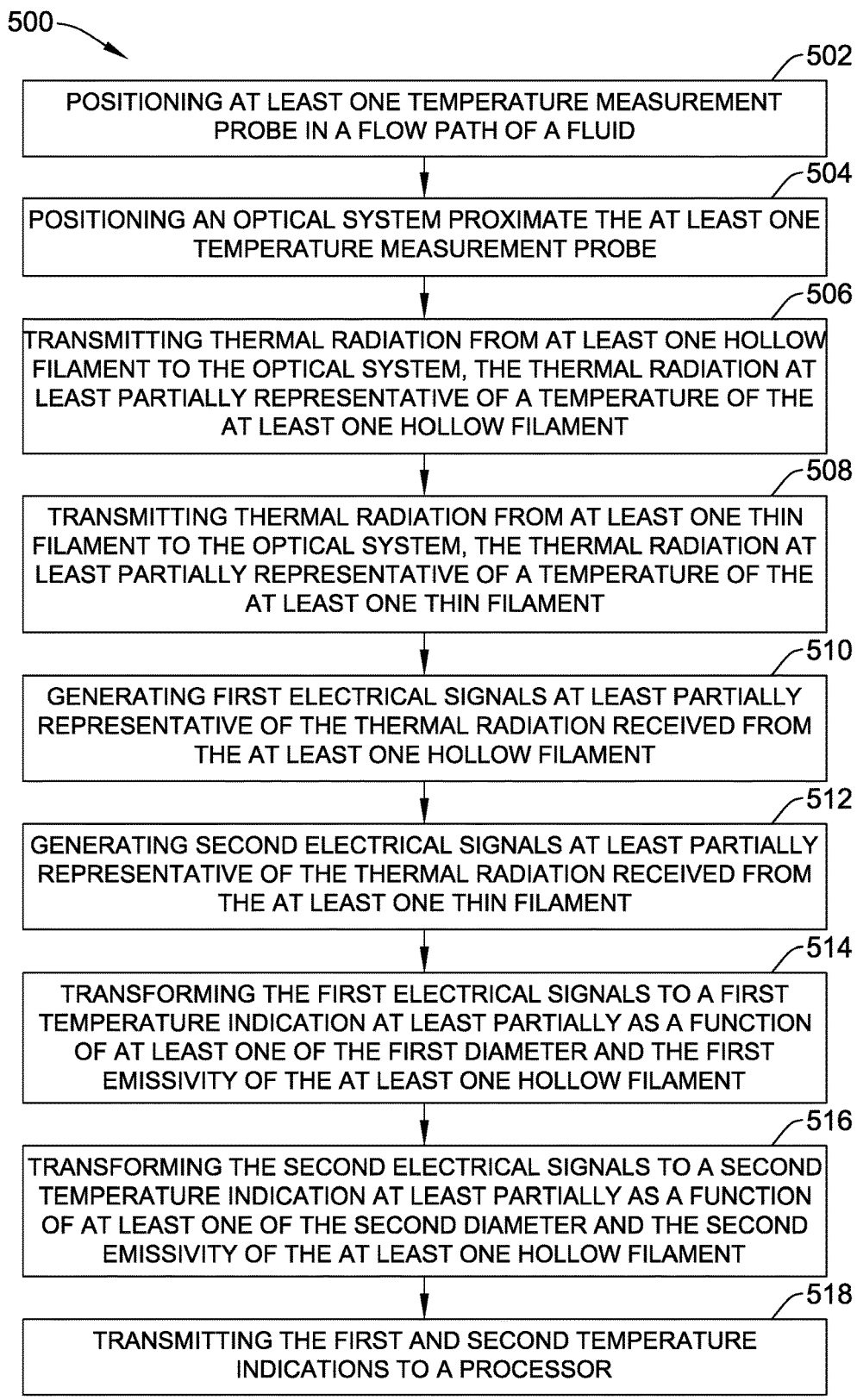
FIG. 13 is a flow chart of an exemplary method of temperature measurement using the gas temperature measurement system shown in FIG. 1.

FIG. 13 is a flow chart of an exemplary method 500 of temperature measurement using gas temperature measurement system 102 (shown in FIG. 1). Referring to FIGS. 1-5 with FIG. 13, at least one temperature measurement probe, i.e., one or more of probes 120 and 310 is positioned 502 in a flow path, i.e., hot gas path 220 of a fluid, i.e., hot temperature gas flow 324. Temperature measurement probe 120/310 includes filament 304 having a first diameter $D_f$ and a first emissivity. Temperature measurement probe 120/310 includes at least one hollow filament 306/312 extending over at least a portion of filament 304. Hollow filament has a second diameter $D_{120}$ greater than first diameter $D_f$ and a second emissivity. Method 500 also includes positioning 504 optical system 124 proximate temperature measurement probe 120/310 and transmitting 506 thermal radiation from hollow filament 306/312 to optical system 124, the thermal radiation at least partially representative of a temperature of filament 306/312. Method 500 further includes transmitting 508 thermal radiation from thin filament 304 to optical system 124, the thermal radiation at least partially representative of a temperature of thin filament 304. Method 500 also includes generating 510 first electrical signals at least partially representative of the thermal radiation received from hollow filament 306/312 and generating 512 second electrical signals at least partially representative of the thermal radiation received from thin filament 304. Method 500 further includes transforming 514 the first electrical signals to a first temperature indication at least partially as a function of at least one of first diameter $D_{120}$ and the first emissivity and transforming 516 the second electrical signals to a second temperature indication at least partially as a function of at least one of second diameter $D_{120}$ and the second emissivity. Method 500 also includes transmitting 518 the first and second temperature indications to processor 134. While temperature measurement probes 120/310 are described for method 500, any of probes 330, 350, 360, 370, and 380 may also be used in any combination thereof.

Figure 14:
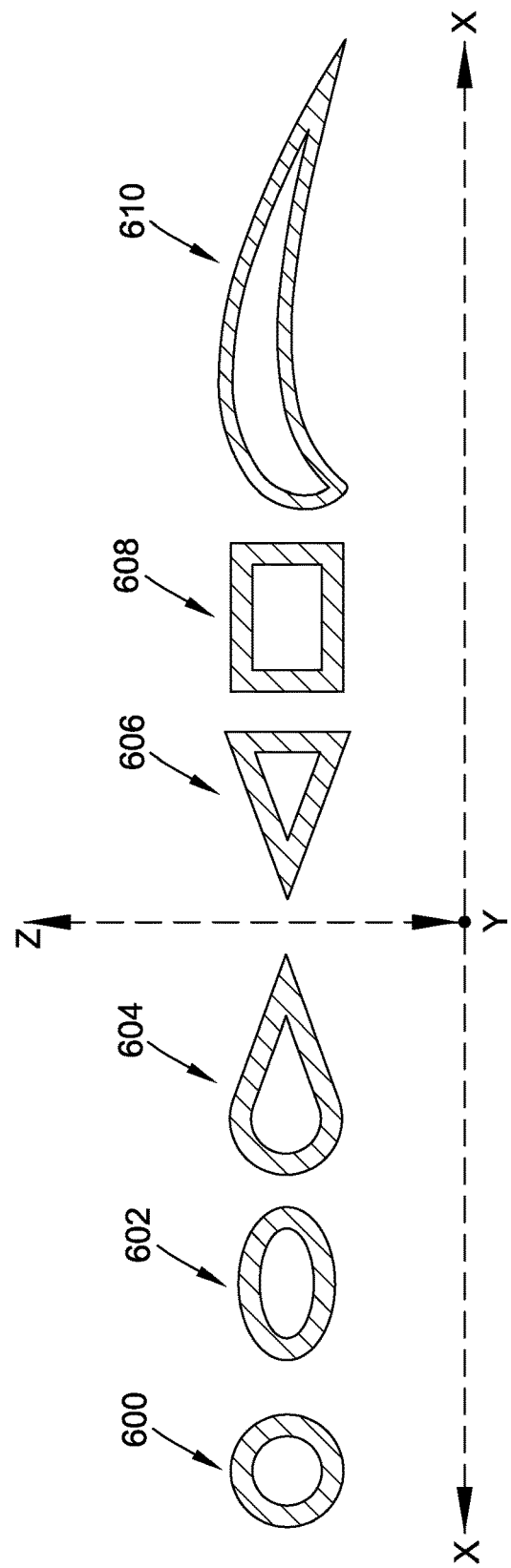
FIG. 14 is a plurality of schematic cross-sectional views of temperature measurement probes that may be used with the gas temperature measurement system shown in FIG. 1.

FIG. 14 is a plurality of schematic cross-sectional views of temperature measurement probes that may be used with gas temperature measurement system 102 (shown in FIG. 1). In some embodiments, the temperature measurement probes have a substantially cylindrical cross-sectional profile 600 similar to temperature measurement probes 306, 312, 332, 356, 362, 276, and 386 (shown in FIGS. 3 and 4, 5, 6, 7, 8, 9, and 10, respectively). In other embodiments, the temperature measurement probes have a substantially ovular cross-sectional profile 602. In further embodiments, the temperature measurement probes have a substantially tear-drop shaped (airfoil-shaped) cross-sectional profile 604. In yet other embodiments, the temperature measurement probes have a substantially triangular cross-sectional profile 606. Alternatively, the temperature measurement probes have any shape that enables operation of temperature measurement system 102 as described herein, including, without limitation, a rectangular profile 608 (including a square profile) and an airfoil profile 610.

The above-described gas temperature measurement systems use thin filament pyrometry that provides a cost-effective and reliable means of monitoring process parameters in heretofore difficult areas of components that experience harsh environmental conditions. As such, the gas temperature measurement systems described herein provide a cost-effective method for monitoring temperatures of components in high temperature and/or high pressure environments. Specifically, the devices, systems, and methods described herein include a method and systems of measuring gas temperatures using radiation thermometry principles to measure hot gas temperatures using silicon carbide filaments. The filament probes disclosed herein include a thin filament within a robust outer hollow filament. Both the thin filament and the outer hollow filament are used to measure the temperatures and the outer hollow filament provides mechanical support to the inner thin filament which otherwise would not have sufficient lifing in the harsh environment. The surface temperatures measured from the inner filament and outer hollow filament re used to derive the local gas temperature based on a multi-element approach, which does not require measurement of the exact flow properties around the probe. As such, the devices, systems, and methods described herein facilitate substantially reduced physical intrusion into the hot gas path of gas turbine engines and lower material and installation costs due to the elimination of water-cooling apparatus. Also, the outer hollow filament facilitates extended lifing of the thin filament enclosed therein. Such extended lifing may be enhanced with air cooling of the temperature measurement probes. Further, taking temperature measurements with two or more devices with varying diameters in close proximity, e.g., multiple thin filaments with varying diameters in an outer hollow filament, facilitates increased accuracy and spatial resolution of the associated temperature measurements. Such increased accuracy and spatial resolution of the associated temperature measurements is further enhanced through the use of a plurality of the unique temperature measurement probes in array and rake configurations.

An exemplary technical effect of the methods, systems, and apparatus described herein includes at least one of: (a) substantially reduced physical intrusion into the hot gas path of gas turbine engines due to the elimination of water-cooling apparatus; (b) substantially reduced material and installation costs due to the elimination of water-cooling apparatus; (c) extended lifing of the thin filament enclosed within the more robust outer hollow filament; (d) further enhancing such extended lifing with air cooling of the temperature measurement probes; (e) generating electrical signals using the received thermal radiation from both the thin filament and the outer hollow filament; (f) increasing the accuracy and spatial resolution of the associated temperature measurements through taking temperature measurements with two or more devices with different diameters in close proximity; and (g) further enhancing such increased accuracy and spatial resolution of the associated temperature measurements through the use of a plurality of the unique temperature measurement probes in array and rake configurations.

Exemplary embodiments of gas temperature measurement systems for gas turbine engines are described above in detail. The gas temperature measurement systems, and methods of operating such systems are not limited to the specific embodiments described herein, but rather, components of systems and/or steps of the methods may be utilized independently and separately from other components and/or steps described herein. For example, the methods may also be used in combination with other systems requiring observation of temperatures in high temperature environments, and are not limited to practice with only the gas turbine engines as described herein. Rather, the exemplary embodiment can be implemented and utilized in connection with many other high temperature applications.

Although specific features of various embodiments of the invention may be shown in some drawings and not in others, this is for convenience only. In accordance with the principles of the invention, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A temperature measurement system comprising:
   at least one temperature measurement probe comprising:
      at least one hollow filament configured to emit thermal radiation in a predetermined and substantially continuous wavelength band at least partially representative of a temperature of said at least one hollow filament, said at least one hollow filament having a first diameter and a first emissivity; and
      at least one thin filament extending within at least a portion of said at least one hollow filament, said at least one thin filament configured to emit thermal radiation in a predetermined and substantially continuous wavelength band at least partially representative of a temperature of said at least one thin filament, said at least one thin filament having a second emissivity and a second diameter less than the first diameter;

an optical system configured to receive at least a portion of the thermal radiation emitted from said at least one thin filament and said at least one hollow filament, said optical system comprising a detector array configured to:

generate first electrical signals at least partially representative of the thermal radiation received from said at least one hollow filament; and generate second electrical signals at least partially representative of the thermal radiation received from said at least one thin filament; and a controller communicatively coupled to said detector array, said controller configured to:

transform the first electrical signals to a first temperature indication at least partially as a function of at least one of the first diameter and the first emissivity; and transform the second electrical signals to a second temperature indication at least partially as a function of at least one of the second diameter and the second emissivity.

2. The temperature measurement system in accordance with claim 1 further comprising a plurality of thin filaments, wherein said plurality of thin filaments comprises said at least one thin filament, said plurality of thin filaments comprising a first thin filament and a second thin filament proximate said first thin filament, said first thin filament having a first thin filament diameter and said second thin filament having a second thin filament diameter different from the first thin filament diameter.

3. The temperature measurement system in accordance with claim 1, wherein said at least one hollow filament comprises:

a first portion coupled to a surface proximate a predetermined temperature measurement location; and a second portion coupled to said first portion.

4. The temperature measurement system in accordance with claim 3, wherein said second portion is at least partially cuneiform.

5. The temperature measurement system in accordance with claim 3, wherein said at least one hollow filament has a cross-sectional shape that is one of substantially cylindrical, ovular, triangular, tear-dropped, rectangular, and airfoil.

6. The temperature measurement system in accordance with claim 1, wherein said at least one temperature measurement probe comprises a plurality of temperature measurement probes in one of an array configuration and a rake configuration.

7. The temperature measurement system in accordance with claim 6, wherein said plurality of temperature measurement probes are proximate each other within a predetermined volume.

8. The temperature measurement system in accordance with claim 7, wherein said plurality of temperature measurement probes are configured to generate a plurality of temperature measurements representative of a portion of at least one of a two-dimensional and a three-dimensional temperature map across the predetermined volume.

9. A method of temperature measurement comprising:

positioning at least one temperature measurement probe in a flow path of a fluid, the at least one temperature measurement probe including:

at least one hollow filament having a first diameter and a first emissivity; and at least one thin filament extending within at least a portion of the at least one hollow filament, the at least one thin filament having a second emissivity and a second diameter less than the first diameter;

positioning an optical system proximate the at least one temperature measurement probe;

transmitting thermal radiation from the at least one filament to the optical system, the thermal radiation at least partially representative of a temperature of the at least one hollow filament;

transmitting thermal radiation from the at least one hollow filament to the optical system, the thermal radiation at least partially representative of a temperature of the at least one thin filament;

generating first electrical signals at least partially representative of the thermal radiation received from the at least one hollow filament;

generating second electrical signals at least partially representative of the thermal radiation received from the at least one thin filament;

transforming the first electrical signals to a first temperature indication at least partially as a function of at least one of the first diameter and the first emissivity;

transforming the second electrical signals to a second temperature indication at least partially as a function of at least one of the second diameter and the second emissivity; and transmitting the first and second temperature indications to a processor.

10. The method in accordance with claim 9, wherein positioning at least one temperature measurement probe in a flow path of a fluid comprises positioning a plurality of temperature measurement probes proximate each other within a predetermined volume.

11. The method in accordance with claim 9, wherein transmitting the first and second temperature indications to a processor comprises generating at least one of a two-dimensional and a three-dimensional temperature map across the predetermined volume.

12. The method in accordance with claim 9 wherein positioning at least one temperature measurement probe in a flow path of a fluid comprises:

coupling a first end of the at least one temperature measurement probe to a surface of a gas turbine component; and extending a second end of the at least one temperature measurement probe into a turbine engine gas path.

* * * * *